(12) United States Patent
Bar-Haim et al.

(10) Patent No.: US 11,341,188 B2
(45) Date of Patent: May 24, 2022

(54) EXPERT STANCE CLASSIFICATION USING COMPUTERIZED TEXT ANALYTICS

(71) Applicant: International Business Machines Corporation, Armonk, NY (US)

(72) Inventors: Roy Bar-Haim, Ramat Gan (IL); Noam Slonim, Jerusalem (IL); Orith Toledo-Ronen, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 16/454,083

(22) Filed: Jun. 27, 2019

(65) Prior Publication Data

US 2020/0410010 A1 Dec. 31, 2020

Related U.S. Application Data

(63) Continuation of application No. 15/453,918, filed on Mar. 9, 2017, now Pat. No. 10,387,472.

(51) Int. Cl.
*G06F 16/00* (2019.01)
*G06F 16/9032* (2019.01)
(Continued)

(52) U.S. Cl.
CPC ........ *G06F 16/90332* (2019.01); *G06F 16/31* (2019.01); *G06F 16/334* (2019.01);
(Continued)

(58) Field of Classification Search
CPC .............. G06F 16/908; G06F 16/9538; G06F 2009/45562; G06F 2009/45591;
(Continued)

(56) References Cited

U.S. PATENT DOCUMENTS 7,865,457 B2 1/2011 Ravin et al.
8,805,844 B2 8/2014 Schorzman et al.
(Continued)

FOREIGN PATENT DOCUMENTS

JP 2016045620 4/2016

OTHER PUBLICATIONS

Improving Claim Stance Classification with Lexical Knowledge Expansion and Context Utilization. WS 2017 • Roy Bar-Haim, Lilach Edelstein, Charles Jochim, Noam Slonim.*
(Continued)

*Primary Examiner* — Yicun Wu
(74) *Attorney, Agent, or Firm* — Dvir Gassner

(57) ABSTRACT

A computerized text analysis method that comprises: searching a resource of information with a search query comprising at least one of: (a) the specific debatable topic, and (b) a personal derivation of the specific debatable topic, to obtain a list of indices whose index subject contains the personal derivation and/or the specific debatable topic; determining, by applying a rule-based classifier, whether the index subject of each of the indices is (i) in favor of the debatable topic or (ii) against the debatable topic; detecting, in each of the indices, hyperlinks to encyclopedic entries whose entry subjects are person names; and determining that: if the index subject of each of the one or more indices is in favor of the specific debatable topic, then the persons are in favor of the specific debatable topic, and vice versa.

18 Claims, 9 Drawing Sheets

(51) Int. Cl.
*G06F 16/955* (2019.01)
*G06F 40/284* (2020.01)
*G06F 40/295* (2020.01)
*G06F 16/31* (2019.01)
*G06F 16/33* (2019.01)
*G06F 40/30* (2020.01)
*G06F 40/134* (2020.01)
*G06V 30/413* (2022.01)

(52) U.S. Cl.
CPC ...... *G06F 16/9558* (2019.01); *G06F 16/9566* (2019.01); *G06F 40/134* (2020.01); *G06F 40/284* (2020.01); *G06F 40/295* (2020.01); *G06F 40/30* (2020.01); *G06V 30/413* (2022.01)

(58) Field of Classification Search
CPC .. G06F 21/62; G06F 21/6236; G06F 3/04842; G06F 3/0614; G06F 3/14; G06F 40/103; G06F 40/123; G06F 40/134; G06F 40/143; G06F 8/433; G06F 9/45558; G06F 9/5005; G06F 9/5011
See application file for complete search history.

(56) References Cited

U.S. PATENT DOCUMENTS

| | | | |
|---|---|---|---|
| 9,251,113 B1* | 2/2016 | McIlroy | G06F 15/17306 |
| 2010/0262610 A1 | 10/2010 | Acosta et al. | |
| 2016/0042071 A1 | 2/2016 | Ghosh et al. | |
| 2018/0260476 A1* | 9/2018 | Bar-Haim | G06F 16/31 |
| 2018/0357220 A1* | 12/2018 | Galitsky | G06F 40/216 |
| 2019/0082224 A1* | 3/2019 | Bradley | G06Q 30/0282 |
| 2019/0332666 A1* | 10/2019 | Dadachev | G06N 20/00 |

OTHER PUBLICATIONS

Sobhani et al., "From Argumentation Mining to Stance Classification", Jun. 4, 2015, p. 67-77, Proceedings of the 2nd Workshop on Argumentation Mining.

Jung et al., "Finding Topic-centric Identified Experts based on Full Text Analysis", Nov. 12, 2007, p. 56-63, vol. 290, Proceedings of the 2nd international Conference on Finding Experts on the Web with Semantics.

Sridhar et al., "Collective Stance Classification of Posts in Online Debate Forums", Jun. 27, 2014, p. 109-117, Proceedings of the Joint Workshop on Social Dynamics and Personal Attributes in Social Media.

Kim et al., "Automatic Identification of Pro and Con Reasons in Online Reviews", Jul. 2006, p. 483-490, Proceedings of the COLING/ACL 2006 Main Conference Poster Sessions.

Hristoskova et al., "A Graph-based Disambiguation Approach for Construction of an Expert Repository from Public Online Sources", Feb. 2013, p. 1-10, 5th International Conference on Agents and Artificial Intelligence, Proceedings.

* cited by examiner

List of atheists (surnames C to D)

From Wikipedia, the free encyclopedia

*Main article: Lists of atheists*

Atheists with surnames starting C and D, sortable by the field for which they are mainly known and na...

| Name | Dates | Known as / for | Who | Ref |
|---|---|---|---|---|
| João Cabral de Melo Neto | 1920–1999 | Author | Brazilian poet, considered one of the greatest Brazilian poets of all time. | "Though an atheist, Cabr... of the devil. When his wif... emblem of Our Lady of C... saying, in his mocking wa... that she went directly to h... stopped at customs."[1] |
| Peter Caffrey | 1949–2008 | Actor | Irish actor, best known for playing Padraig O'Kelly in Series | "Born in Dublin in 1949, C... school plays but subsequ... two years with a view to t... played one in Coronation |

*512a*

WIKIPEDIA
the free encyclopedia

Main page
Contents
Featured content
Current events
Random article
Donate to Wikipedia
Wikipedia store Interaction
Help
About Wikipedia
Community portal
Recent changes
Contact page Tools
What links here
Related changes
Upload file
Special pages

EXPERT STANCE CLASSIFICATION USING COMPUTERIZED TEXT ANALYTICS

CROSS-REFERENCE TO RELATED APPLICATIONS

This application is a continuation of U.S. patent application Ser. No. 15/453,918, filed Mar. 9, 2017, entitled "Expert Stance Classification Using Computerized Text Analytics."

BACKGROUND

The invention relates to the field of computerized text analytics.

Text analytics (also "text mining"), is often defined as the computerized process of deriving high-quality of information from text. High-quality information is typically obtained by automatically analyzing patterns and trends through means such as statistical pattern learning. Text analytics commonly involves the process of structuring the input text (usually parsing, along with the addition of some derived linguistic features and the removal of others, and subsequent insertion into a database), deriving patterns within the structured data, and finally evaluation and interpretation of the output.

Typical text analytics tasks include text categorization, text clustering, concept/entity extraction, production of granular taxonomies, sentiment analysis, document summarization, and entity relation modeling.

Text analytics typically involves automatic tasks such as information retrieval, lexical analysis to study word frequency distributions, pattern recognition, tagging/annotation, information extraction, data mining techniques including link and association analysis, visualization, and predictive analytics. The overarching goal is, essentially, to turn text into data for analysis, via application of natural language processing (NLP) and analytical methods.

Text analytics tasks include computer-executed rulesets that cause the computer to analyze the input text in a different way from how a human would have done so. These rulesets also allow the computer to analyze massive amounts of text in very short times, a task not feasible by humans. Sometimes the computer analysis even provides more accurate results than human analysis.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computerized text analysis method, comprising operating one or more hardware processors to perform the following actions:

Automatically access, through a computer network, at least one resource of digital textual information, wherein:

First, the digital textual information comprises multiple digital documents that are each accessible through a unique URL (Uniform Resource Locator).

Second, some of the digital documents are encyclopedic entries, each having an entry subject and each containing digital text with facts about the respective entry subject, wherein some of the entry subjects are debatable topics, and some of the entry subjects are person names.

Third, some of the digital documents are indices each having an index subject and each containing hyperlinks to some of the encyclopedic entries that are associated with the index subject.

Receive a specific one of the debatable topics as input.

Automatically search the at least one resource of digital textual information with a search query comprising at least one of: (a) the specific debatable topic, and (b) a personal derivation of the specific debatable topic, to obtain a list of one or more of the indices whose index subject contains the query.

Automatically determine, by applying a rule-based classifier, whether the index subject of each of the one or more indices included in the list is (i) in favor of the debatable topic or (ii) against the debatable topic.

Automatically detect, in each of the one or more indices included in the list, hyperlinks to certain ones of the encyclopedic entries whose entry subjects are person names.

Automatically determine that: (i) if the index subject of each of the one or more indices included in the list is in favor of the specific debatable topic, then persons whose person names are the entry names of the certain ones of the encyclopedic entries—are in favor of the specific debatable topic (ii) if the index subject of each of the one or more indices included in the list is against the specific debatable topic, then persons whose person names are the entry names of the certain ones of the encyclopedic entries—are against the specific debatable topic.

In some embodiments, the method further comprises automatically determining the personal derivation of the specific debatable topic, wherein the personal derivation is a lexical derivation of the specific debatable topic that has a person as a direct or inherited hypernym.

In some embodiments, the automatic determination of the personal derivation is performed by automatically querying the WordNet lexical database.

In some embodiments, the method further comprises repeating the steps of the method, to generate a database of: persons, debatable topics, and a stance of each of the persons towards one or more of the debatable topics, wherein the stance is either in favor of a corresponding debatable topic or against a corresponding debatable topic.

In some embodiments, the method further comprises generating a stance graph that visualizes at least a portion of the database, wherein, in the stance graph: the debatable topics are represented as nodes; the persons are represented as nodes; and the stance of each of the persons towards one or more of the debatable topics is represented as edges that are labeled in accordance with the stance.

In some embodiments, in the stance graph, the edges are labeled using different colors.

In some embodiments, in the stance graph, the edges are labeled using different texts.

In some embodiments, the rule-based classifier is programmed to perform a regular expression (RegEx) analysis of the index subject of each of the one or more indices included in the list, to detect positive and negative words that affect a stance of the index subject.

In some embodiments, the automatic detection of the hyperlinks to certain ones of the encyclopedic entries whose entry subjects are person names, comprises detecting that the certain ones of the encyclopedic entries are characterized by an "rdf:type" value of "person".

Another embodiment relates to a computerized text analysis method, comprising operating one or more hardware processors to perform the following actions:

Receive a debatable topic as a digital text input.

Automatically access, through a computer network, at least one resource of digital textual information.

Automatically search the at least one resource of digital textual information with a search query comprising at least one of: (a) the debatable topic, and (b) a personal derivation of the debatable topic, to obtain one or more sentences in which the debatable topic appears.

Automatically apply a named-entity recognition (NER) algorithm to the one or more sentences, to identify a name of a person appearing in the one or more sentences.

Statistically analyze, automatically, each of the one or more sentences, to determine a level of association between the respective name appearing in the sentence and the debatable topic appearing in the sentence.

Automatically determine, by applying a machine learning classifier, whether the stance of the person, as expressed in the one or more sentences, is (i) in favor of the debatable topic or (ii) against the debatable topic.

In some embodiments, the statistical analysis comprises computation of pointwise mutual information (PMI).

In some embodiments, the method further comprises repeating steps (a)-(e), to generate a list of multiple person names, multiple debatable topics, and multiple levels of association; and for each debatable topic, automatically selecting a subset of the person names who have a highest level of association with the respective debatable topic.

In some embodiments, the method further comprises repeating steps (a)-(e), to generate a list of multiple person names and multiple debatable topics; and for each debatable topic, automatically selecting a subset of the person names who more frequently than other person names appear in the respective sentences.

In some embodiments, the method further comprises automatically training the machine learning classifier using a training set which comprises: multiple sentences that each include a name of a person and a debatable topic; and a human-generated label for each of the multiple sentences, wherein the label indicates whether the respective sentence expresses a stance of the respective person (i) in favor of the respective debatable topic or (ii) against the respective debatable topic.

In some embodiments, the method further comprises automatically training the machine learning classifier using a training set which comprises: multiple sentences that each include a name of a person and a debatable topic; and an automatically-generated label for each of the multiple sentences, wherein the label is deemed to indicate whether the respective sentence expresses a stance of the respective person (i) in favor of the respective debatable topic or (ii) against the respective debatable topic, wherein the label is obtained by:

First, automatically accessing, through a computer network, at least one other resource of digital textual information, wherein:

The digital textual information comprises multiple digital documents that are each accessible through a unique URL (Uniform Resource Locator).

Some of the digital documents are encyclopedic entries, each having an entry subject and each containing digital text with facts about the respective entry subject, wherein some of the entry subjects are debatable topics, and some of the entry subjects are person names.

Some of the digital documents are indices each having an index subject and each containing hyperlinks to some of the encyclopedic entries that are associated with the index subject.

Second, receiving a specific one of the debatable topics as input.

Third, automatically searching the at least one other resource of digital textual information with a personal derivation of the specific debatable topic as a search query, to obtain a list of one or more of the indices whose index subject contains the personal derivation.

Fourth, automatically determining, by applying a rule-based classifier, whether the index subject of each of the one or more indices included in the list is (i) in favor of the specific debatable topic or (ii) against the specific debatable topic.

Fifth automatically detecting, in each of the one or more indices included in the list, hyperlinks to certain ones of the encyclopedic entries whose entry subjects are person names.

Sixth, automatically determining that: (i) if the index subject of each of the one or more indices included in the list is in favor of the specific debatable topic, then persons whose person names are the entry names of the certain ones of the encyclopedic entries—are in favor of the specific debatable topic (ii) if the index subject of each of the one or more indices included in the list is against the specific debatable topic, then persons whose person names are the entry names of the certain ones of the encyclopedic entries—are against the specific debatable topic.

Seventh, repeating the first to sixth steps, to generate a database of: persons, debatable topics, and a stance of each of the persons towards one or more of the debatable topics, wherein the stance is either in favor of a corresponding debatable topic or against a corresponding debatable topic, and wherein the stance serves as the label.

Additional embodiments relate to computer program products for text analysis, each of the computer program product comprising a non-transitory computer-readable storage medium having program code embodied therewith, the program code executable by at least one hardware processor to execute steps of the above methods.

Further embodiments relate to systems that each comprise: (a) at least one hardware processor; and (b) a non-transitory computer-readable storage medium having program code embodied therewith, the program code executable by at least one hardware processor to perform steps of the above methods.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 4 shows a screenshot of another exemplary encyclopedic entry having an entry subject and digital text with facts about the entry subject;

FIG. 5A shows a screenshot of an exemplary index having an index subject and hyperlinks to encyclopedic entries that are associated with the index subject;

FIG. 5B shows a screenshot of another exemplary index having an index subject and hyperlinks to encyclopedic entries that are associated with the index subject;

DETAILED DESCRIPTION

Disclosed herein is a computerized text analysis method, as well as a system and a computer program product incorporating the same. The method locates and classifies the stance of various persons (also termed "experts") with respect to debatable topics, by automatically mining large quantities of digital texts. For example, the method may traverse resources of digital textual information, such as digital encyclopedias or Internet search engine results, to locate names of persons who hold various stances with respect to different debatable topics. By analyzing the textual information, the method may be able to deduce the stance of every such person towards one or more debatable topics. Optionally, the method also generates a stance graph that visualizes the stances of various persons towards different debatable topics.

In some embodiments, the method obtains background information on the pertinent person from a specifically-structured digital encyclopedia, to deduce his or her stance towards a debatable topic.

Figure 1:
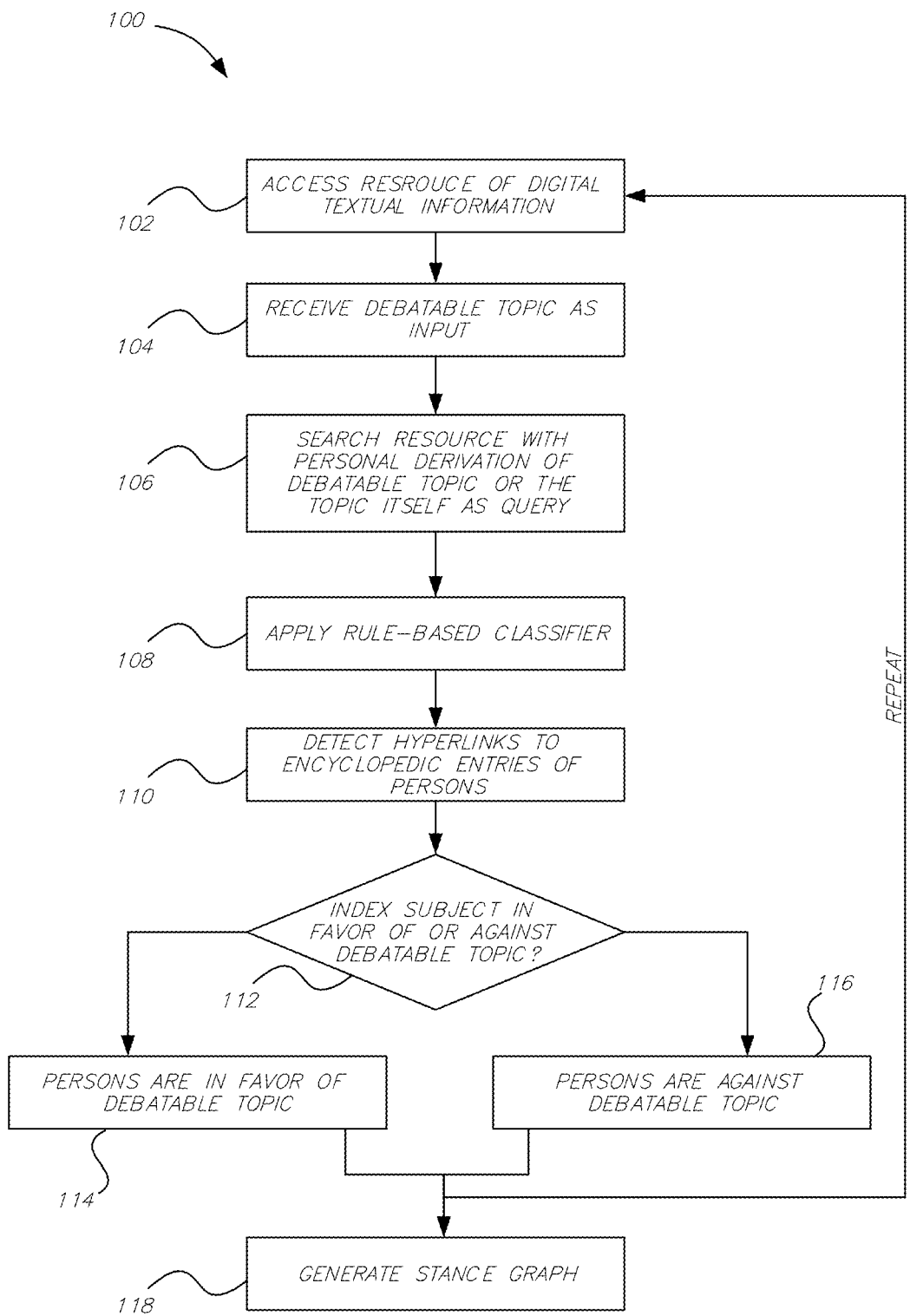
FIG. 1 shows a flowchart of a computerized text analysis method, in accordance with some embodiments.

Reference is now made to FIG. 1, which shows a flowchart of a computerized text analysis method 100, in accordance with some embodiments. Method 100 may be executed by one or more hardware processors.

In a step 102, at least one resource of digital textual information may be accessed, for example through a computer network. Alternatively, the at least one resource of digital textual information may be stored locally in the same computer executing method 100.

For example, the digital textual information may be part of an Internet encyclopedia, such as Wikipedia, The Free Encyclopedia, available at http://www.wikipedia.org. Other digital encyclopedias, whether Internet-accessible or locally-accessible, are also intended herein.

Interim reference is made to FIG. 2, which is a block diagram illustrating the structure of an exemplary resource of digital textual information (hereinafter "resource") 200.

The digital textual information that is obtained from that resource may include multiple digital documents 201 that are each accessible through a unique location pointer, such as a URL (Uniform Resource Locator). A "digital document", as referred to herein, relates to a digitally-stored file that contains text and optionally media such as graphics. For example, a digital document may be a HyperText Markup Language (HTML) file, a Portable Document Format (PDF) file, an Extensible Markup Language (XML) file, etc.

Some of the digital documents are encyclopedic entries 202. Each of encyclopedic entries 202 may have an entry subject 204, and contain digital text 206 with facts about the respective entry subject. Some of entry subjects 204 are person names, and some of the entry subjects are debatable topics, as FIGS. 3A-3B and 4 exemplify, respectively.

Figure 3A:
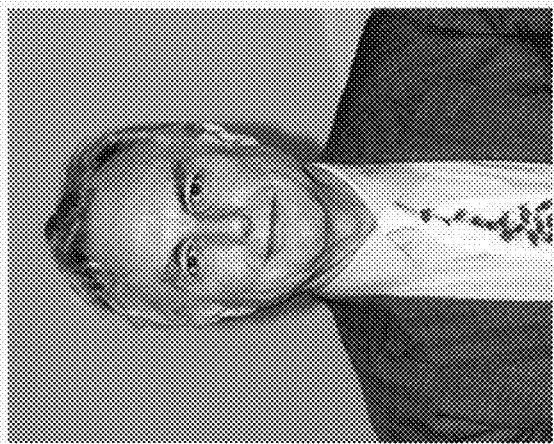
FIG. 3A shows a screenshot of an exemplary encyclopedic entry having an entry subject and digital text with facts about the entry subject.
Figure 3B:
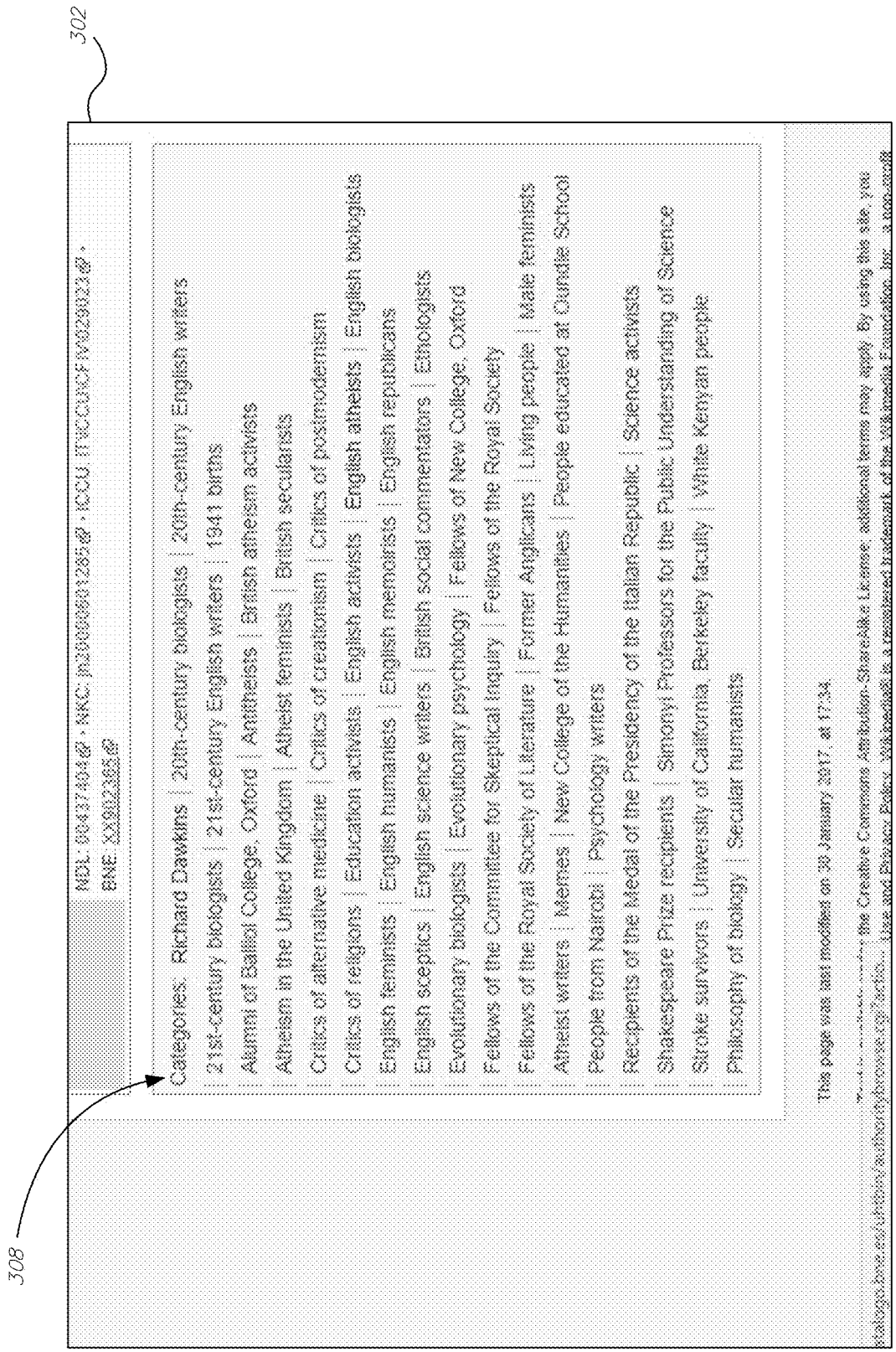
FIG. 3B shows a screenshot of the bottom of the page of the exemplary encyclopedic entry of FIG. 3A.

For example, in FIG. 3A, an encyclopedic entry 302 accessible through the URL https://en.wikipedia.org/wiki/Richard_Dawkins has an entry subject "Richard Dawkins" 304, and digital text 306 with facts about Richard Dawkins. Entry subject 304 is a person name. FIG. 3B shows the bottom of the page of encyclopedic entry 302 of FIG. 3A, where there is a list of categories 308 this encyclopedic entry belongs to. Categories indicative of Richard Dawkins' atheist stance include "antitheists", "British atheism activists", "English atheists", "atheist writers", and more. Additionally, the stance of Richard Dawkins towards other debatable topics, such as humanism and feminism, can also be deduces from the list of categories 308.

Figure 4:
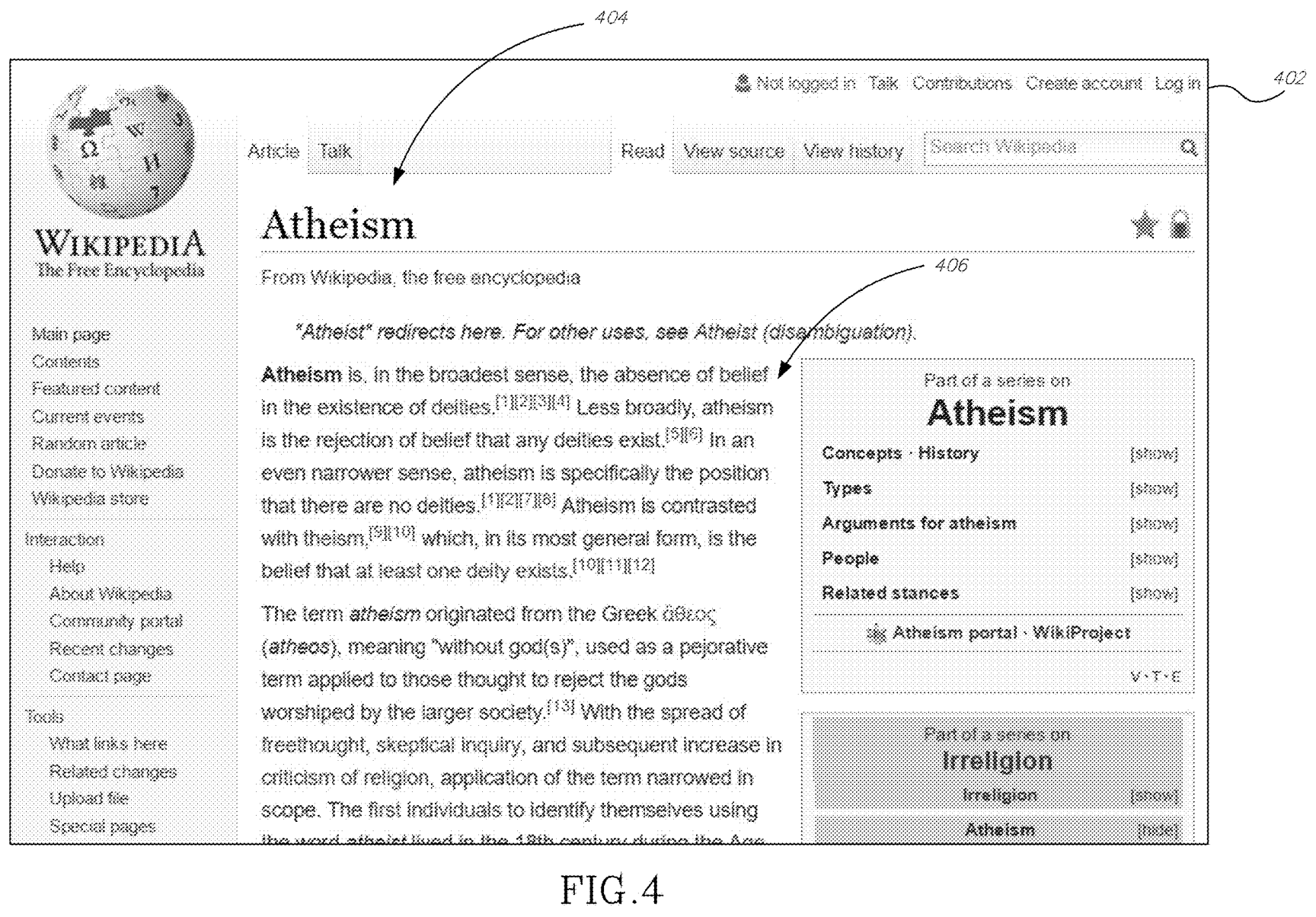

For example, in FIG. 4, an encyclopedic entry 402 accessible through the URL https://en.wikipedia.org/wiki/Atheism has an entry subject "Atheism" 404, and digital text 406 with facts about atheism. Entry subject 404 is a debatable topic.

Figure 2:
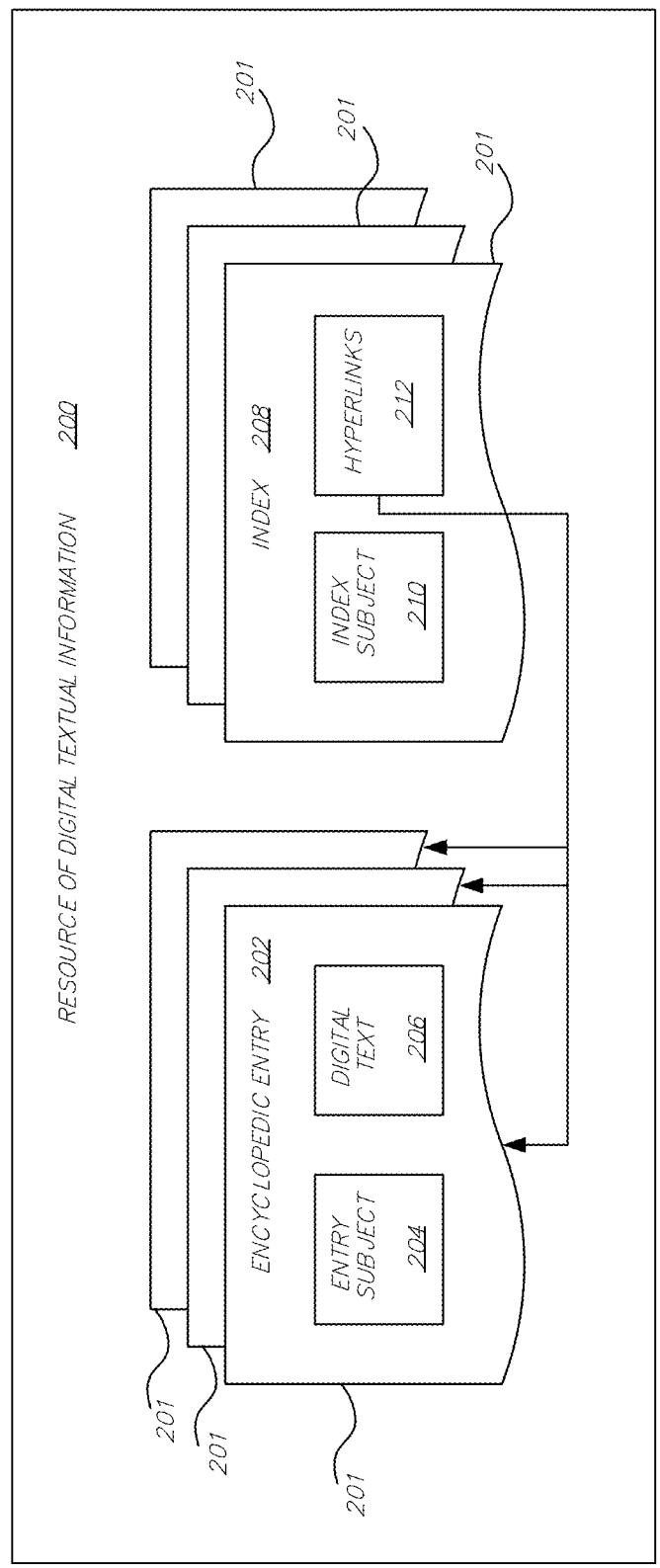
FIG. 2 shows a block diagram illustrating the structure of an exemplary resource of digital textual information, in accordance with some embodiments.

Back to FIG. 2, some of digital documents 201 are indices 208 each having an index subject 210 and each containing hyperlinks 212 to some of the encyclopedic entries that are associated with the index subject, such as to encyclopedic entries that has a person name and/or a debatable topic as their entry subjects.

For example, in FIG. 5A, an index 508a accessible through the URL https://en.wikipedia.org/wiki/List_of_atheists_(surnames_C_to_D) has an index subject "List of atheists (surnames C to D)" 510a, and hyperlinks 512a to encyclopedic entries that are associated with the index subject, namely—to encyclopedic entries of atheists whose surnames begin with a "C" or a "D".

As another example, an index 508b accessible through the URL https://en.wikipedia.org/wiki/Category:English_atheists has an index subject "Category:English atheists" 510b, and hyperlinks 512b to encyclopedic entries that are associated with the index subject, namely—to encyclopedic entries of English atheists.

FIGS. 5A-5B are therefore illustrative of two index types available on Wikipedia—a "list" and a "category", respectively.

Referring back to FIG. 1, method 100 may proceed as follows.

In a step 104, a specific one of the debatable topics included in the resource(s) may be received as input, for example from a user. For instance, the specific debatable topic may be "atheism".

In a step 106, the resource(s) is automatically searched using a query which includes at least one of: (a) the specific debatable topic (e.g., "atheism"), and (b) a personal derivation of the specific debatable topic. The personal derivation is optionally the lexical derivation of the specific debatable topic that has a person as a direct or inherited hypernym. In the "atheism" example, the personal derivation is "atheist". The personal derivation may be deduced by automatically querying a computerized lexical database, such as the WordNet lexical database available at http://wordnet.princeton.edu. See G. A. Miller. WordNet: A Lexical Databases for English. *Communications of the ACM*, pages 39-41, November 1995; Christiane Fellbaum (1998, ed.) WordNet: An Electronic Lexical Database. Cambridge, Mass.: MIT Press.

Step 106 concludes with the obtaining of a list of one or more indices whose index subject contains the query. For example, if searching Wikipedia for "atheist", the returned search results may be a list of indices such as "List of atheists (surnames A to B)", "List of atheists (surnames C to D)", "List of atheists in music", and "List of atheists in science and technology", to name a few.

In a step 108, it is automatically determined, by applying a rule-based classifier, whether the index subject of each of the one or more indices included in the list obtained in step 106 is (i) in favor of the debatable topic or (ii) against the debatable topic.

The rule-based classifier may be a computer program that performs a regular expression (RegEx) analysis of the index subject of each of the one or more indices included in the list. This analysis may detect positive and negative words that affect a stance of the index subject.

An exemplary rule-based classifier is shown below:
Input: index IND; debatable topic T; personal derivation for the debatable topic PD
Output: stance classification of IND into PRO/CON/NONE
    if IND=~"critics of T" then return CON
    else if IND=~"anti/former/ . . . PD" then return CON
    else if IND=~"PD opponent/dissident/ . . . " then return CON
    else if IND=~"PD" then return PRO
    else if IND=~"anti/former/ . . . T PERSON" then return CON
    else if IND=~"T PERSON" then return PRO
    else return NONE For example, when applying the rule-based classifier to the "List of atheists (surnames C to D)" index in Wikipedia (FIG. 5), the "IND=~'PD' then return PRO" condition will be satisfied, since the index contains "Atheists". This index will therefore be classified as "PRO"—in favor of the debatable topic "Atheism". The term "PERSON" appearing in this exemplary classifier is optionally all possible hyponyms of the word "person", which may be fetched from the WordNet lexical database. Examples include "activist", "advocate", "writer", which mean that "T PERSON" can read "atheism activist", "atheism advocate", and "atheism writer", respectively.

In a step 110, each of the one or more indices included in the list is automatically analyzed, to detect hyperlinks to certain ones of the encyclopedic entries whose entry subjects are person names. Optionally, the automatic detection of the hyperlinks includes detecting that those certain ones of the encyclopedic entries are characterized by an "rdf:type" value of "person". The rdf:type value of encyclopedic entries, for example those in Wikipedia, may be obtained from a computerized information resource such as DBpedia, available at http://dbpedia.org. See Jens Lehmann et al. A large-scale, multilingual knowledge base extracted from Wikipedia. In *Semantic Web Journal* 2014. DBpedia may be automatically queried to determine which of the encyclopedic entries have an "rdf:type" value of "person".

In a step 112, it may be automatically determined that:
Option 114: If the index subject of each of the one or more indices included in the list is in favor ("PRO") of the specific debatable topic, then persons whose person names are the entry names of the certain ones of the encyclopedic entries—are in favor of the specific debatable topic. For example, "Richard Dawkins" will be determined to be in favor of "Atheism" because his name is the entry name 304 (FIG. 3A) of an encyclopedic entry 302 (FIG. 3A) linked from the "List of atheists (surnames C to D)" index 510*a* (FIG. 5A) which was classified as "PRO" in step 108 (FIG. 1).

Alternatively, option 116: If the index subject of each of the one or more indices included in the list is against ("CON") the specific debatable topic, then persons whose person names are the entry names of the certain ones of the encyclopedic entries—are against the specific debatable topic.

Steps 102-116 may be repeated any number of desired times to generate a computerized stance database of: persons, debatable topics, and a stance of each of the persons towards one or more of the debatable topics.

In step 118, an optional stance graph that visualizes the stance database (or a portion thereof) may be automatically generated. Step 118 may utilize one of the existing software tools for graph visualization, such as, for example, Graphviz (available at http://www.graphviz.org). The software tool may be provided with a translation of the stance database (obtained by repeating steps 102-116, as discussed above) into a graph description language, such as DOT. The DOT syntax of Graphviz, for example, is available at http://www.graphviz.org/content/dot-language (last viewed Jan. 31, 2017).

Figure 6:
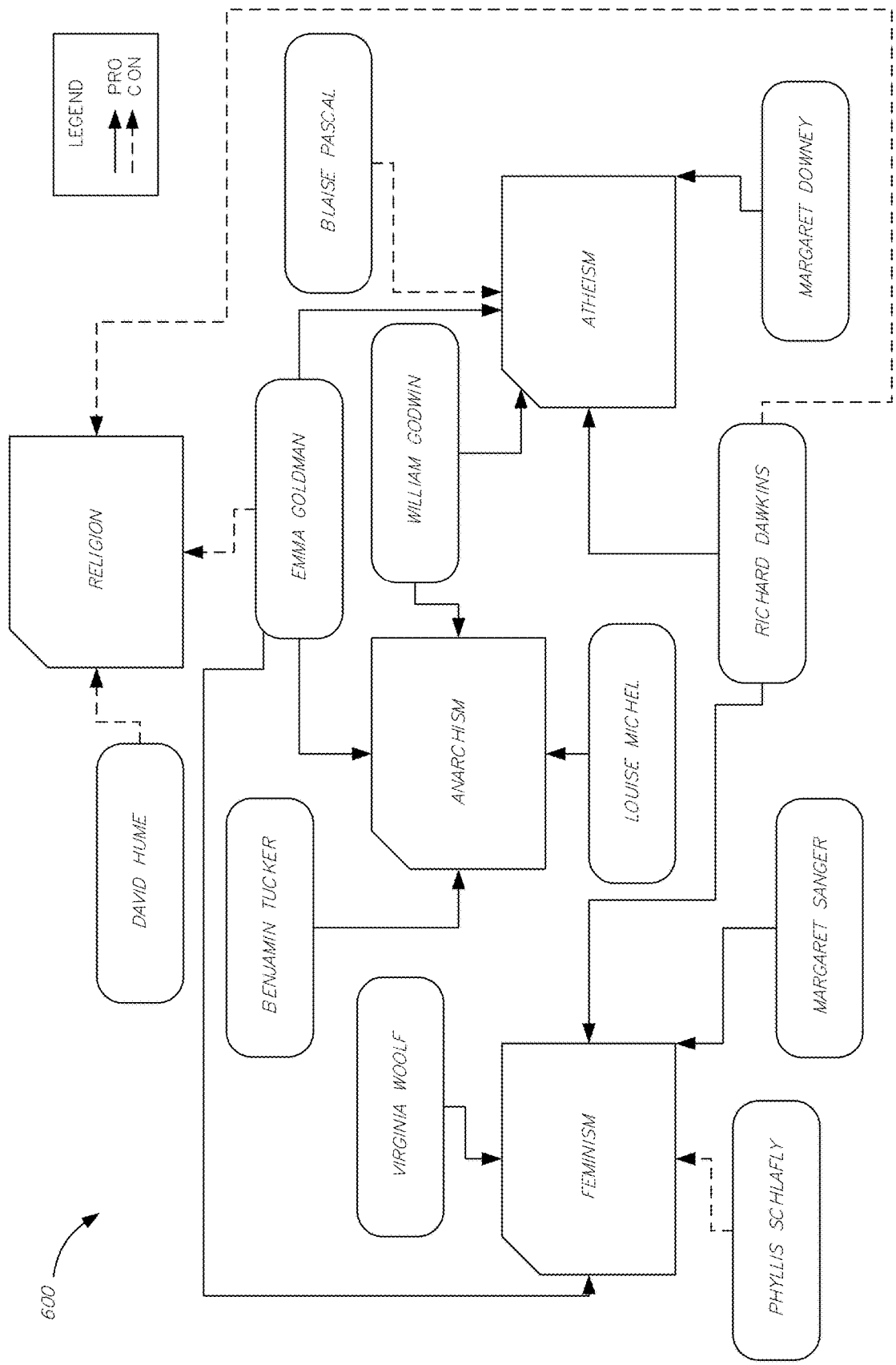
FIG. 6 shows an exemplary stance graph, in accordance with some embodiments.

Reference is now made to FIG. 6, which shows an exemplary stance graph 600. While stance graph 600 shows specific graphics that represent the various entities in the graph, it is explicitly intended for any other visualization to be included in present embodiments.

Debatable topics, such as Feminism, Anarchism, Religion, and Atheism, may be represented as nodes. Also persons, such as Phyllis Schlafly, Virginia Woolf, and Richard Dawkins, may be represented as nodes. Nodes are optionally visualized by a closed shape with text inside. The debatable topic nodes are optionally of a different shape than the person nodes.

The stance of each of the persons towards one or more of the debatable topics is represented as edges (e.g. arrows) that are labeled in accordance with the stance. For example, in the figure, the stance of Richard Dawkins towards Atheism is labeled "Pro", and his stance towards Religion is labeled "Con".

The exemplary edges shown in the figure are labeled graphically, for example with a continuous arrow for a "pro" stance, and a dashed arrow for a "con" stance, etc. Additionally or alternatively, edges may be labeled by different colors and/or by different texts (for example, text displayed adjacent to plain lines or arrows that connect the nodes).

Figure 7:
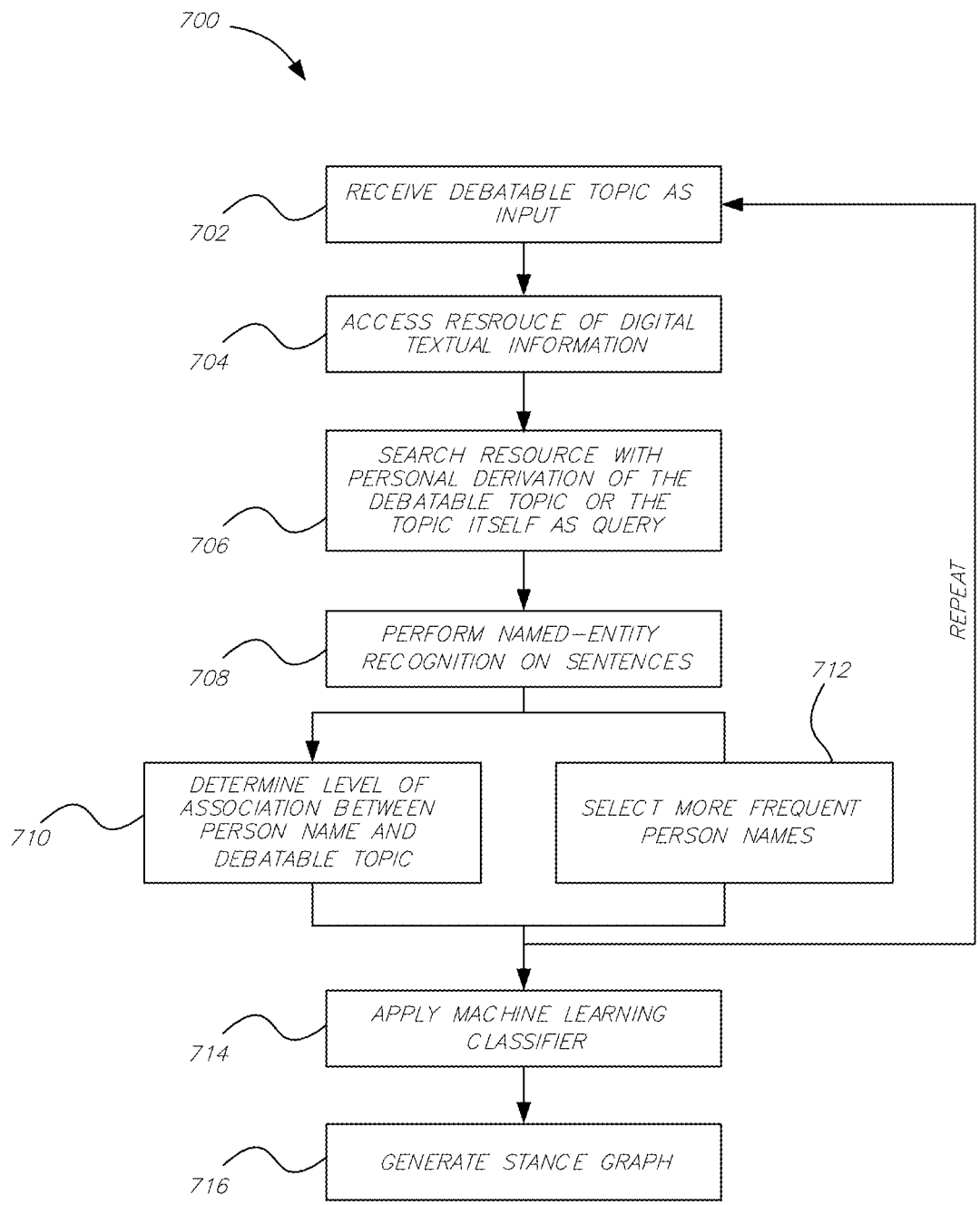
FIG. 7 shows a flowchart of another computerized text analysis method, in accordance with some embodiments.

Reference is now made to FIG. 7, which shows a flowchart of another computerized text analysis method 700, in accordance with some embodiments. Method 700 may be executed by one or more hardware processors. Method 700, differently than method 100, takes a machine learning approach to classify the stance of persons toward a debatable topic In a step 702, a debatable topic is received as a digital text input.

In a step 704, at least one resource of digital textual information may be accessed, for example through a computer network. Alternatively, the at least one resource of digital textual information may be stored locally in the same computer executing method 700.

For example, the resource may be the World Wide Web, which is accessible and searchable by an Internet search engine, such as Google® (accessible via http://www.google.com) or Bing® (accessible via http://www.bing.com).

As another example, the resource may be an Internet encyclopedia, such as Wikipedia.

As a further example, the resource may be a corpus of text that was mined from one or more sources, and indexed on a sentence level; namely, each sentence in the corpus becomes a document in the index, and a search of the index with one or more keywords returns a list of documents (sentences) containing those keywords.

In a step 706, the resource may be searched by the above search engines or any other search engine, with at least one of (a) the debatable topic, and (b) a personal derivation of the debatable topic, as a search query. The results obtained from the search engine may include web pages (or other types of digital documents) that contain sentences in which the debatable topic appears. For example, for a query "atheism", one of the obtained sentences may be "Oxford professor Richard Dawkins has helped steer evolutionary science into the 21st century, and his concept of the "meme" contextualized the spread of ideas in the information age. In recent years, his devastating critique of religion has made him a leading figure in the New Atheism.", taken from the web page https://www.ted.com/talks/richard_dawkins_on_militant_atheism (last viewed on Feb. 21, 2017).

In a step 708, a named-entity recognition (NER) algorithm may be automatically applied to the one or more sentences, to identify a name of a person appearing in the one or more sentences. Returning to the previous example, the NER algorithm identifies the name "Richard Dawkins" in the sentence.

Suitable NER algorithms include, to name a few examples: General Architecture for Text Engineering (GATE) by the University of Sheffield, available at http://gate.ac.uk; the Apache OpenNLP library, available at http://opennlp.apache.org; and the Stanford Named Entity Recognizer by Stanford University, available at http://nlp.stanford.edu/software/CRF-NER.shtml.

In a step 710, each of the one or more sentences may be statistically analyzed, to determine a level of association between the respective name appearing in the sentence and the debatable topic appearing in the sentence. The statistical analysis is optionally a computation of pointwise mutual information (PMI). The level of association may be denoted, for example, by a value between 0 and 1, with 0 denoting no association and 1 denoting full association. Optionally, person names having higher levels of association than other names, for the same debatable topic, may be selected for usage in the next steps of the method. For example, a threshold value (of, e.g., 0.7) may be used to select those person names above the threshold and discard of those below the threshold. Alternatively, a percentile-based threshold may be used, to select those person names in a defined percentile range and discard of all others.

In a step 712, for each debatable topic, the method may automatically select a subset of the person names appearing in the list who appear in the respective sentences more frequently than other person names. For example, Richard Dawkins may be selected and David Hume may be filtered out, if Dawkins appears more frequently in sentences that include the debatable topic "atheism" than Hume. The term "frequently" may refer to a number of sentences in which a person name appears in conjunction with the debatable topic and/or it personal derivation.

Steps 710 and 712 are performed either in parallel or in series. Their joint output, which is a list of person names filtered by association (step 710) and/or frequency (712), serves as input to the following step.

In a step 714, a machine learning classifier may be applied to the filtered list, to determine whether the stance of each of the persons, as expressed in the one or more sentences, is in favor of the debatable topic or against the debatable topic.

The machine learning classifier may be previously trained using a training set which includes multiple sentences each including a name of a person and a debatable topic, as well as a human-generated label for each of the multiple sentences, which label indicates whether the respective sentence expresses a stance of the respective person in favor of or against the respective debatable topic.

This training obtains features such as, for example, the presence of specific words in a sentence, the location of those words in the sentence (e.g., immediately preceding or superseding the person name and/or the debatable topic), etc., so as to yield a robust classifier able to match human classification abilities.

Additionally or alternatively, the training set may include multiple sentences, each including a name of a person and a debatable topic, as well as an automatically-generated label for each of the multiple sentences. The label is deemed to indicate, at a high probability, whether the respective sentence expresses a stance of the respective person in favor of or against the respective debatable topic. This automatically-generated label may be obtained, for example, by repeatedly executing steps 102-116 of method 1 (FIG. 1).

Steps 702-714 may be repeated any number of desired times to generate a computerized stance database of: persons, debatable topics, and a stance of each of the persons towards one or more of the debatable topics.

In step 716, an optional stance graph that visualizes the stance database (or a portion thereof) may be automatically generated, similar to the technique used in step 118 (FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized text analysis method, comprising:
    automatically accessing at least one digital document whose subject comprises a name of a person;
    automatically accessing at least one different digital document whose: (a) subject comprises a debatable topic or a personal derivation of the debatable topic, (b) content comprises the name of the person;
    automatically determining whether the subject of the at least one different digital document is in favor of the debatable topic or against the debatable topic; and
    automatically determining a stance of the person with respect to the debatable topic, based on the determination of whether the subject of the at least one different digital document is in favor of the debatable topic or against the debatable topic.

2. The method according to claim 1, further comprising automatically determining the personal derivation of the debatable topic, wherein the personal derivation is a lexical derivation of the debatable topic that has a person as a direct or inherited hypernym.

3. The method according to claim 2, wherein the automatic determination of the personal derivation is performed by automatically querying the WordNet lexical database.

4. The method according to claim 1, wherein:
    the at least one digital document is an encyclopedic entry containing digital text with facts about the person, wherein the encyclopedic entry is accessible through a Uniform Resource Locator (URL); and
    the at least one different digital document is an index containing hyperlinks to URLs of multiple encyclopedic entries including to the URL of the encyclopedic entry.

5. The method according to claim 4, further comprising detecting that the at least one digital document is the encyclopedic entry by detecting that the at least one digital document is characterized by an "rdf:type" value of "person".

6. The method according to claim 1, wherein the determining of whether the subject of the at least one different digital document is in favor of the debatable topic or against the debatable topic is performed by applying a rule-based classifier that is programmed to perform a regular expression (RegEx) analysis of the subject, to detect positive and negative words that affect a stance of the subject.

7. A computer program product for text analysis, the computer program product comprising a non-transitory computer-readable storage medium having program code embodied therewith, the program code executable by at least one hardware processor to:
   automatically access at least one digital document whose subject comprises a name of a person;
   automatically access at least one different digital document whose: (a) subject comprises a debatable topic or a personal derivation of the debatable topic, (b) content comprises the name of the person;
   automatically determine whether the subject of the at least one different digital document is in favor of the debatable topic or against the debatable topic; and
   automatically determine a stance of the person with respect to the debatable topic, based on the determination of whether the subject of the at least one different digital document is in favor of the debatable topic or against the debatable topic.

8. The computer program product according to claim 7, wherein the program code is further executable by said at least one hardware processor to determine the personal derivation of the debatable topic, wherein the personal derivation is a lexical derivation of the debatable topic that has a person as a direct or inherited hypernym.

9. The computer program product according to claim 8, wherein the automatic determination of the personal derivation is performed by automatically querying the WordNet lexical database.

10. The computer program product according to claim 7, wherein:
    the at least one digital document is an encyclopedic entry containing digital text with facts about the person, wherein the encyclopedic entry is accessible through a Uniform Resource Locator (URL); and
    the at least one different digital document is an index containing hyperlinks to URLs of multiple encyclopedic entries including to the URL of the encyclopedic entry.

11. The computer program product according to claim 10, wherein the program code is further executable by said at least one hardware processor to detect that the at least one digital document is the encyclopedic entry by detecting that the at least one digital document is characterized by an "rdf:type" value of "person".

12. The computer program product according to claim 7, wherein the determining of whether the subject of the at least one different digital document is in favor of the debatable topic or against the debatable topic is performed by applying a rule-based classifier that is programmed to perform a regular expression (RegEx) analysis of the subject, to detect positive and negative words that affect a stance of the subject.

13. A system comprising:
    (a) at least one hardware processor; and
    (b) a non-transitory computer-readable storage medium having program code embodied therewith, the program code executable by said at least one hardware processor to:
        automatically access at least one digital document whose subject comprises a name of a person;
        automatically access at least one different digital document whose: (a) subject comprises a debatable topic or a personal derivation of the debatable topic, (b) content comprises the name of the person;
        automatically determine whether the subject of the at least one different digital document is in favor of the debatable topic or against the debatable topic; and
        automatically determine a stance of the person with respect to the debatable topic, based on the determination of whether the subject of the at least one different digital document is in favor of the debatable topic or against the debatable topic.

14. The system according to claim 13, wherein the program code is further executable by said at least one hardware processor to determine the personal derivation of the debatable topic, wherein the personal derivation is a lexical derivation of the debatable topic that has a person as a direct or inherited hypernym.

15. The system according to claim 14, wherein the automatic determination of the personal derivation is performed by automatically querying the WordNet lexical database.

16. The system according to claim 13, wherein:
    the at least one digital document is an encyclopedic entry containing digital text with facts about the person, wherein the encyclopedic entry is accessible through a Uniform Resource Locator (URL); and
    the at least one different digital document is an index containing hyperlinks to URLs of multiple encyclopedic entries including to the URL of the encyclopedic entry.

17. The system according to claim 16, wherein the program code is further executable by said at least one hardware processor to detect that the at least one digital document is the encyclopedic entry by detecting that the at least one digital document is characterized by an "rdf:type" value of "person".

18. The system according to claim 13, wherein the determining of whether the subject of the at least one different digital document is in favor of the debatable topic or against the debatable topic is performed by applying a rule-based classifier that is programmed to perform a regular expression (RegEx) analysis of the subject, to detect positive and negative words that affect a stance of the subject.

* * * * *